(12) United States Patent
Lucioni et al.

(10) Patent No.: US 7,065,057 B2
(45) Date of Patent: Jun. 20, 2006

(54) METHOD AND APPARATUS FOR IMPROVING THE TRANSMISSION QUALITY IN A PACKET-ORIENTED DATA TRANSMISSION NETWORK

(75) Inventors: Gonzalo Lucioni, Witten (IT); Ralf Neuhaus, Luenen (DE); Rainer Uecker, Muelheim (DE)

(73) Assignee: Siemens Aktiengesellschaft, Munich (DE)

( * ) Notice: Subject to any disclaimer, the term of this patent is extended or adjusted under 35 U.S.C. 154(b) by 959 days.

(21) Appl. No.: 09/960,884

(22) Filed: Sep. 21, 2001

(65) Prior Publication Data

US 2002/0060991 A1 May 23, 2002

(30) Foreign Application Priority Data

Sep. 21, 2000 (DE) ................... 100 46 901

(51) Int. Cl.
H04J 1/02 (2006.01)
H04J 3/00 (2006.01)
H04J 3/18 (2006.01)

(52) U.S. Cl. ............ 370/286; 370/477; 370/493; 370/521; 709/224

(58) Field of Classification Search ........ 370/229–252, 370/276–289, 328–394, 401–477, 497–521; 709/224–235, 244–251
See application file for complete search history.

(56) References Cited

U.S. PATENT DOCUMENTS

| | | | | |
|---|---|---|---|---|
| 4,100,377 A | * | 7/1978 | Flanagan | 370/435 |
| 6,118,763 A | * | 9/2000 | Trumbull | 370/231 |
| 6,259,680 B1 | * | 7/2001 | Blackwell et al. | 370/286 |
| 6,434,139 B1 | * | 8/2002 | Liu et al. | 370/352 |
| 6,449,251 B1 | * | 9/2002 | Awadallah et al. | 370/229 |
| 6,563,870 B1 | * | 5/2003 | Schenk | 375/232 |
| 6,574,272 B1 | * | 6/2003 | Peace | 375/222 |
| 6,687,236 B1 | * | 2/2004 | Goldstein | 370/289 |
| 6,925,174 B1 | * | 8/2005 | LeBlanc | 379/406.01 |
| 2001/0006511 A1 | * | 7/2001 | Matt | 370/286 |
| 2001/0055985 A1 | * | 12/2001 | Matt et al. | 455/570 |
| 2004/0233999 A1 | * | 11/2004 | Manstorfer et al. | 375/257 |
| 2005/0141493 A1 | * | 6/2005 | Hardy et al. | 370/356 |

FOREIGN PATENT DOCUMENTS

| | | |
|---|---|---|
| DE | 19819551 A1 | 11/1999 |
| DE | 10006245 A1 | 8/2001 |
| EP | 1 006 672 | 6/2000 |
| WO | WO 96/29840 | 9/1996 |
| WO | WO 00/41367 | 7/2000 |

OTHER PUBLICATIONS

Article entitled "Time Scale Modification of Speech Based on Short-Time Fourier Analysis" by M.R. Portnoff, IEEE Transactions on ASSP, Jul., 1981, pp. 374-390.

* cited by examiner

*Primary Examiner*—Man U. Phan
(74) *Attorney, Agent, or Firm*—Bell, Boyd & Lloyd LLC

(57) ABSTRACT

A method and apparatus for improving the transmission quality in a packet-oriented data transmission network, wherein time-critical data is transmitted over a packet-oriented data transmission network having a number of communications equipment units which are networked to one another.

11 Claims, 1 Drawing Sheet

METHOD AND APPARATUS FOR IMPROVING THE TRANSMISSION QUALITY IN A PACKET-ORIENTED DATA TRANSMISSION NETWORK

BACKGROUND OF THE INVENTION

The present invention relates to a method for transmitting time-critical data in a packet-oriented data transmission network having a number of communications devices connected to one another, and a communications equipment unit for carrying out the method.

The present invention is concerned with a communications system having a number of spatially distributed communications equipment units. The individual communications equipment units are connected to one another via a packet-oriented data transmission network, e.g., a local area network (LAN) and/or a wide-area network (WAN). Furthermore, the communications equipment units are connected to a public communications network. Data is transmitted over the data transmission network via of an asynchronous packet-oriented transmission protocol, such as the Internet Protocol (IP).

Time-critical data, particularly voice data, to be transmitted, inter alia, between the communications equipment units, is transmitted over the data transmission network asynchronously, for instance, after having been packaged into IP packets. The term frequently used to describe this procedure is "Voice Over IP", also known as VoIP. Individual sampled values of the signal to be transferred (i.e., voice data to be transferred) are packaged into what are referred to as "frames". A number of frames are in turn packaged into a data packet and transferred over the data transmission network to the respective receiver (i.e., to the respective communications equipment unit).

Some of the known packet-oriented data transmission networks, such as an IP-oriented network, cannot ensure the service quality which is necessary for the transmission of time-critical data (i.e., "Quality of Service", also known as QoS). However, when time-critical data, such as voice data, are transmitted, the effects of a number of QoS parameters, such as packet transit times, jitter, the packet throughput rate and packet loss rate, are of decisive importance for the transmission quality of the time-critical data.

The known standard H.323 of the International Telecommunication Union Telecommunication Standardization Sector (ITU-T) contains technical specifications for audio and video communication over packet-oriented data transmission networks which do not provide definite service quality. The standard H.225.0, which is associated with the standard H.323 of the ITU-T, specifies, inter alia, mechanisms for packaging, synchronizing and maintaining service quality. The service quality is maintained by taking into account the packet loss rate, whereby bit errors which can lead to a packet loss are also taken into account, and by taking into account the delays/transit times within a link. The core mechanisms for achieving the service quality are always defined or effective in a transmitter device (i.e., from a communications equipment unit to the data transmission network).

Within the standard H.323, the Real Time Protocol or Real Time Transfer Protocol (RTP) and the Real Time Control Protocol (RTCP) are defined. These protocols are used for real-time-critical transmission of data, such as audio and video data, over a packet-oriented data transmission network. In order to reduce a packet loss rate, overloading of the data transmission network is monitored via an RTCP component of the respective data packets, the transmission load being reduced if overloading occurs. Furthermore, disruptive echoes from one communications device to the data transmission network, which arise as a result of a prolonged transit time of data packets, are eliminated via echo compensation.

In the prior art, the following measures for improving the quality of time-critical data to be transmitted, particularly voice data, are implemented in communications equipment units with an integrated H.323 functionality. According to the standard H.225.0, in order to reduce the packet loss rate, the packet transmission rate is reduced in the transmission direction if there is an overload of the data transmission network. This is done by increasing the number of frames per RTP packet. The control is performed via RTCP data. The packet rate is also reduced via what is referred to as "Silence Compression/Suppression" (i.e., by virtue of the fact that data is not transmitted over the data transmission network in a pause in speech).

For echo compensation, an "echo canceler" is implemented, for instance, in accordance with the standard G.165 of the ITU-T, for each link, it being possible to activate or deactivate the echo canceler according to requirements.

In addition, in the event of a packet loss in a receiver device (i.e., from the data transmission network to the communications equipment unit), a noise packet (if appropriate even in attenuated form) is output.

An object of the present invention is, therefore, to provide a method for transmitting time-critical data in a packet-oriented data transmission network and a communications equipment unit for carrying out this method, the method and equipment unit optimizing the quality of a link over the packet-oriented data transmission network.

SUMMARY OF THE INVENTION

In order to improve the quality of the data transmission of terminals connected to a packet-oriented data transmission network, in particular when time-critical data is transmitted between communications equipment units, the present invention implements the procedure of echo compensation (echo control) with link-dependent functionality, whereby the respective communications equipment unit carries out the echo compensation as a function of the respective link (i.e., as a function of whether a link is made to a public communications network (in the POTS or ISDN system) or within a packet-oriented data transmission network, such as over a LAN or over a WAN (e.g., the Internet)). One advantage of the present invention is that the echo compensation can thus be adapted to the requirements of the respective link. In addition, fewer expensive components have to be made available for echo compensation because to a certain extent, simpler components provide adequate echo compensation for specific links.

A further procedure for improving the quality is that the frame rate, and thus also the packet transmission rate of the data packets to be transmitted, are reduced when the data transmission network is overloaded. When data packets are lost, the time-critical data to be transferred is reconstructed at the receive end.

Methods for the two last-mentioned procedures (i.e., the reduction of the packet transmission rate by a transmitter device and the reconstruction of data in the event of a loss of data packets by the receiver) have already been proposed in the German patent application with the official application number 100 06 245.8.

A further procedure for improving the quality of transmission of time-critical data over a packet-oriented data transmission network is to transmit a number of successive sampled values (or frames) of the time-critical data to be transmitted in different data packets (frame interleaving). Thus, when data packets are lost, it is not necessary to reconstruct a plurality of successive sampled values. The distortions which arise as a result of the reconstruction of the lost data therefore occur to a lesser degree than when a number of successive sampled values are reconstructed.

A reduction in the transmission load (i.e., a reduction in the data to be transmitted) is achieved by virtue of the fact that signaling data which is assigned to the data and which controls the transmission of data is compressed according to known methods.

Furthermore, the time-critical data to be transmitted can be compressed via a transmitter device in accordance with compression methods and decompressed again via a receiver device in accordance with decompression methods which are particularly bit-error tolerant (e.g., MPEG-4). Advantageous use is made of the fact that bit errors in the transmission of time-critical audio data, preferably voice data, do not necessarily lead to audible distortions.

This procedure is particularly suitable for data transmission networks which are more susceptible to interference. Examples of these are "shared LANs," in which a large number of terminals which are connected to the data transmission network access the data transmission network, and "wireless LANs," in which the data is transmitted over an air interface.

The procedures described can be totally or partially integrated, according to requirements, into a packet-oriented data transmission network or into terminals which are connected to the data transmission network, preferably in communications equipment units with access to the packet-oriented data transmission network.

One advantage of implementing the procedures described is that the quality of transmission of time-critical data, preferably audio data, over a packet-oriented data transmission network is considerably improved. In addition, the use of more cost-effective components makes it possible to achieve a cost saving on the terminals connected to the data transmission network.

In order to perform echo compensation as a function of a link between the respective terminals, it is possible to connect an adaptive filter or a damping element, which is significantly simpler in structure than an adaptive filter. It is thus necessary, for instance, in the case of an audio link with an analog subscriber (in particular over a long link) to use a technically complex adaptive filter. However, if there is a link to a subscriber with a digital terminal, it has been found that often a simple damping element is adequate for echo compensation.

Thus, less complex echo compensators (adaptive filters) have to be made available for a specific number of possible links in the telecommunications equipment unit according to the present invention than in the prior art because it is highly probable that simple damping elements will be adequate for some of the links.

The planning of a required functionality within the scope of echo compensators can be carried out, for instance, with reference to the standards G.113 of the ITU-T or EIA/TIA TSB32-A.

The reduction of the frame rate, and thus the reduction of the number of data packets to be transferred (i.e., a reduction in the packet transmission rate) is achieved by lowering the sample rate with which a signal to be transmitted, preferably an audio signal, is sampled. Furthermore, the packet transmission rate can be reduced by converting the timing of the signal, preferably of an audio signal. In order to convert the timing of the signal, it is determined whether two successive time intervals of the signal have a largely similar amplitude profile. If so, the data (corresponding to the sampled values of the signal to be transmitted) of just one of these two time intervals is transmitted. The duration of the transmission of data is thus shortened from two time intervals to one time interval for the corresponding data. This method of conversion is known as "time scale modification," described in "Time Scale Modification of Speech Based on Short-Time Fourier Analysis" by M. R. Portnoff, IEEE Transactions on ASSP, July 1981, pages 374 to 390. When the audio signal is converted, its tone pitch is largely retained.

The reduction of the number of sampled values and the reduction of the duration of the signal to be transmitted have to be correspondingly reversed again in a receiver device, preferably in a communications equipment unit receiving the data.

When lost data is reconstructed in a receiver device, the conversion of the timing is also applied as described above. The difference is that a data packet which precedes the lost data packets and/or a data packet following the lost data packets is extended in terms of its timing in such a way that a gap brought about by the lost data packet or packets in the signal is closed or at least made smaller.

The division of successive sampled values or frames is carried out according to one embodiment of the present invention in such a way that the frames are numbered consecutively and separated according to even and uneven numbering. The frames with even numbering are transferred over the data transmission network in first data packets, and frames with uneven numbering are transferred over the data transmission network in second data packets. The data packets are identified by whether they contain "even" or "uneven" frames. Thus, it is possible, for example, to use free bits in the header of a respective data packet, such as free bits in the header of RTP packets. Via the identification, the frames can be assembled again in the correct sequence by a device which receives the data packets.

According to a further embodiment of the present invention, signaling data is compressed by compressing the header data of a data packet (e.g., an RTP data packet), thereby resulting in a reduction in the data transmission rate.

Additional features and advantages of the present invention are described in, and will be apparent from, the following Detailed Description of the Invention and the FIGURE.

DETAILED DESCRIPTION OF THE INVENTION

Figure 1:
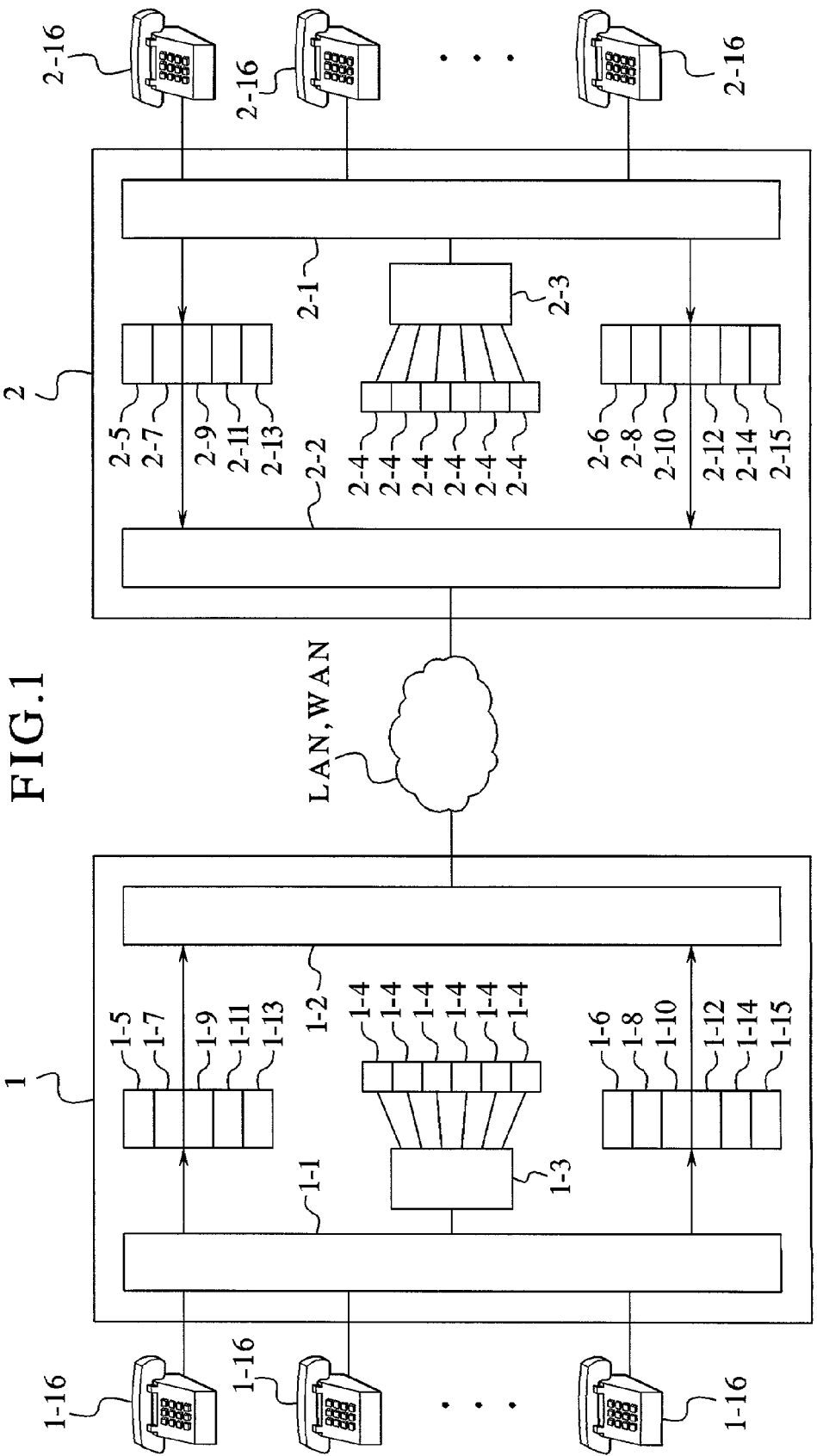
FIG. 1 shows a schematic illustration of two interconnected communications equipment units in accordance with the principles of the present invention.

FIG. 1 shows a schematic illustration of a preferably private communications system, composed of two communications equipment units 1, 2 in accordance with the principles of the present invention. The two communications equipment units 1, 2 are connected to one another via a packet-oriented data transmission network LAN, WAN, whereby the data transmission network can be embodied as a LAN, such as within a building, or as a WAN, such as between two towns. In the case of a WAN, the data may be transmitted over the Internet. In order to connect to the packet-oriented data transmission network LAN, WAN, the communications equipment units 1, 2 have correspondingly configured interfaces 1–2, 2—2.

Furthermore, the communications equipment units 1, 2 may be connected to a public communications network (not illustrated), data being transmitted between a communications equipment unit 1, 2 and a communications equipment unit arranged in the public communications network either in a POTS (Plain Old Telephone Service) system or in an ISDN (Integrated Service Digital Network) system.

Within the packet-oriented data transmission network LAN, WAN, time-critical data, preferably audio data (e.g., sampled values of a sampled voice signal) is transmitted in IP packets. Again, this procedure is known as "Voice Over IP", or VoIP for short. Transmission of audio data and video data over an IP-oriented network is defined in the Standard H.323 of the ITU-T.

Terminals 1–16, 2–16 (e.g., conventional telephones or correspondingly configured data processing devices) whose audio data is to be transmitted are connected to the communications equipment units 1, 2 via a switching device 1—1, 2–1.

The communications equipment units 1, 2 contain a respective selection device 1–3, 2–3 for selecting a suitable echo compensator 1–4, 2–4 as a function of a link which has been set up. Echo compensation is carried out from the respective communications equipment unit 1, 2 to the corresponding network (i.e., to the packet-oriented data transmission network or to the public communications network).

If a link is set up to an analog exchange in the public communications network (e.g., from terminal 1–16), the link is automatically detected by the selection device 1–3 and an adaptive filter is activated to perform echo compensation. However, if terminal 1–16 sets up a link to terminal 2–16 within the communications system over the packet-oriented data transmission network, this link is also automatically detected by the selection device 1–3, and a damping element may be activated to perform echo compensation.

Furthermore, the communications equipment units 1, 2 each contain a reduction device. The reduction device serves to reduce the packet transmission rate for the packet-oriented data transmission network and is implemented by reducing the sampling-rate with a sampling rate reduction device 1–5, 2–5 in a transmitter device. In a receiver device, the reduction of the sampling rate is reversed again via an inversely operating receiver-end sampling-rate reduction device 1–6, 2–6.

The duration of the audio signal is reduced in a transmitter device via a duration reduction device 1–7, 2–7. In a receiver device, the reduction of the duration is reversed again via an inversely operating receiver-end duration reduction device 1–8, 2–8.

Successive sampled values, to be transmitted, of a sampled audio signal for the transmission of data over the packet-oriented data transmission network are allocated to different data packets (RTP packets) via an allocation device 1–9, 2–9 implemented in the respective communications equipment units 1, 2. Frames which are numbered as "even" and "uneven" are allocated to different data packets. The frames which are interleaved in this way are assembled again into their original sequence by an allocation device 1–10, 2–10 in a receiver device.

In addition, signaling data (e.g., the data of an RTP header) is compressed in the data packets to be transmitted, via a signaling compression device 1–11, 2–11. The decompression of this data is carried out in a receiver device via a corresponding signaling decompression device 1–12, 2–12.

Audio data can also be compressed with suitable Codec methods (e.g., MPEG-4) for data transmission. The compression is carried out in a transmitter device via an audio compression device 1–13, 2–13. The decompression is carried out in a receiver device of an audio decompression device 1–14, 2–14.

In order to compensate packet losses, a reconstruction device 1–15, 2–15 is provided in a receiver device. When a data packet is lost, the reconstruction device 1–15, 2–15 outputs the data packet which precedes the lost data packet and/or follows the lost data packet repeatedly to the receiver (i.e., to the corresponding terminal 1–16, 2–16 connected to the communications equipment unit 1, 2).

Although the present invention has been described with reference to specific embodiments, those of skill in the art will recognize that changes may be made thereto without departing from the spirit and scope of the invention as set forth in the hereafter appended claims.

The invention claimed is:

1. A method for transmitting time-critical data over a packet-oriented data transmission network, the method comprising the steps of:

providing, as part of the network, a plurality of communications devices connected to one another;

connecting a plurality of terminals to the communications devices;

selecting an echo compensator as a function of a type of link between the terminals;

transmitting sampled values of the time-critical data to be transferred over the data transmission network in data packets;

reducing a packet transmission rate of the data packets to be transferred when the data transmission network is overloaded;

reconstructing, in a receiver device, received time-critical data, in the event of a loss of data packets; and compressing and decompressing signaling data and time-critical data using bit-error-tolerant Codec methods for voice data transmission.

2. A method of data transmission as claimed in claim 1, the method further comprising the step of selecting, in order to perform echo compensation, one of an echo compensator with adaptive filters and an echo compensator with damping elements, depending on the type of link.

3. A method of data transmission as claimed in claim 1, wherein the step of reducing the packet transmission rate is achieved by reducing a sampling rate for sampling the time-critical data.

4. A method of data transmission as claimed in claim 1, wherein the step of reducing the packet transmission rate is achieved by reducing a duration of the time-critical data while substantially maintaining a tone pitch.

5. A method of data transmission as claimed in claim 1, wherein the step of reconstructing the received time-critical data is achieved as a result of the data packet which precedes or follows a lost data packet is output again by the receiver.

6. A method of data transmission as claimed in claim 1, wherein signaling data is the data in a packet header of the data packets.

7. A method of data transmission as claimed in claim 1, wherein the time-critical data is audio data.

8. A communications equipment unit for connecting a plurality of terminals to a communications network, the communications equipment unit comprising:

an interface to a packet-oriented data transmission network, wherein sampled values of time-critical data to be transferred are transmitted over the data transmission network in data packets;

a selection device for selecting an echo compensator as a function of a link between the terminals;

a reduction device for reducing a packet transmission rate of the data packets to be transferred, when the data transmission network is overloaded;

a reconstruction device for reconstructing, in the event of a loss of data packets, time-critical data to be received;

a signaling compression device and a signaling decompression device for respectively compressing and decompressing signaling data; and a data compression device and a data decompression device for respectively compressing and decompressing the time-critical data via bit-error-tolerant Codec methods for voice data transmission.

9. A communications equipment unit as claimed in claim 8, wherein the reduction device reduces a sampling rate when the time-critical data is sampled.

10. A communications equipment unit as claimed in claim 8, wherein the reduction device reduces a duration of the time-critical data while substantially maintaining a tone pitch of the time-critical data.

11. A communications equipment unit as claimed in claim 8, wherein the time-critical data is audio data.

* * * * *